United States Patent Office 3,065,663
Patented Nov. 27, 1962

3,065,663
FRINGE COMPARATOR
John F. Donnelly and James D. Van Putten, Jr., Holland, Mich., assignors to Donnelly Mirrors, Inc., a corporation of Michigan
Filed July 22, 1957, Ser. No. 673,208
2 Claims. (Cl. 88—14)

This invention relates to a method and apparatus for testing the flatness or curvature of surfaces compared with the surface of the so-called test plate or proof plate.

Apparatus for testing the flatness or curvature of a glass surface or other flat reflecting surface is extremely old. The tests are based upon the principle that if a shallow convex glass surface is laid on a flat one a system of rings is seen around the point of contact. These rings are called "Newton's rings." This phenomenon of Newton's rings results from the reflection of light from the adjacent surfaces of the glass plates. An explanation of this is found in the text "Prism and Lens Making," by F. Twyman, 2nd edition, 1952, pages 375–383.

One test ultimately derived from this phenomenon of Newton's rings is the so-called "Laurent's modification of Fizeau's apparatus." In this apparatus the glass plate to be tested is spaced from a flat polished surface of the proof plate or optical flat. A light is projected through a collimating lens onto the surfaces of the plates producing an interference pattern consisting of fringes, the shape and spacing of which determines the flatness of the glass plate. Apparatus of this type is disclosed and described on page 382 of the above mentioned text "Prism and Lens Making."

Conventional apparatus and methods of this type have been quite successful in forming good interference patterns. The difficulty, however, is in accurately measuring the spacing between the fringes and calculating from such spaces the radius of curvature of the glass plate. The common method of measuring the spacing is to use a divider in counting the number of fringes included in one inch. This method is extremely difficult and inaccurate because the divider cannot touch the equipment without upsetting the entire test. Therefore, the operator with extreme care tries to steadily hold the divider slightly above the equipment while he counts the fringes. It is obvious that this method is a hit and miss proposition and anyone testing the glass plate arrives at different results each time the test is made.

An object of this invention is to provide a method and apparatus which eliminates these difficulties.

Another object of this invention is to provide a method and apparatus in which an image of a calibrated reticle is superimposed upon an image of the interference pattern enabling the operator to quickly determine the degree flatness of the plate being examined.

Still another object of this invention is to provide a method and apparatus for testing flatness of glass plates, the results achieved with such apparatus and method being accurately produced time after time by different operators.

A further object of this invention is to provide a method and apparatus for testing the flatness of glass plates in which method and apparatus the guess work is entirely eliminated.

A further object is to provide a simple "go and not go" method of determining whether or not glass plates meet a given specification for flatness or curvature.

Still other objects of our invention will become obvious upon reading the following specification in conjunction with the accompanying drawings wherein:

FIG. 6 is a plan view of a reticle plate.

FIG. 14 is a representation of an interference pattern shown for purposes of explaining a formula.

Figure 1:
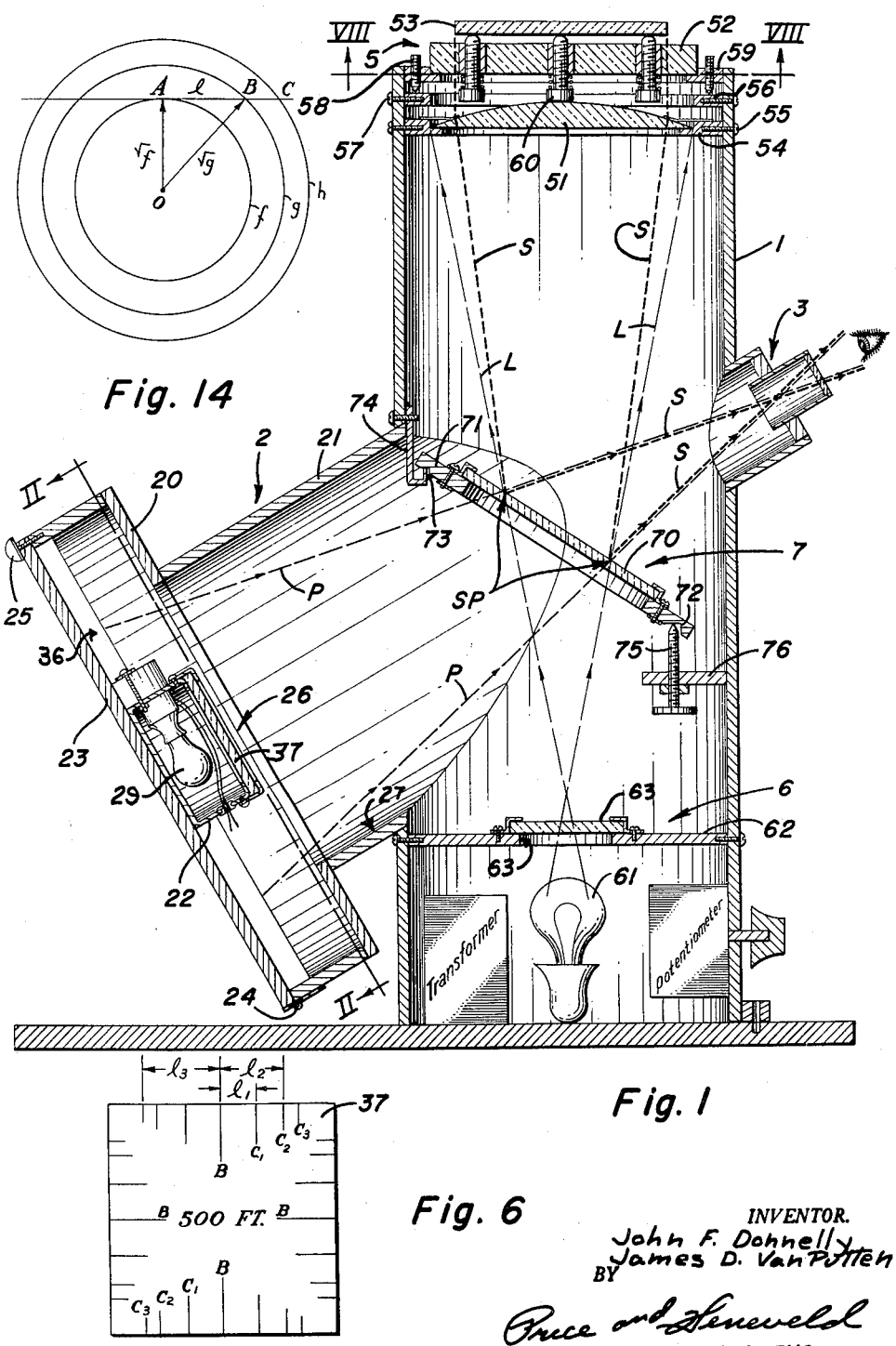
FIG. 1 is a side elevational, sectional, schematic view of the apparatus.
Figure 2:
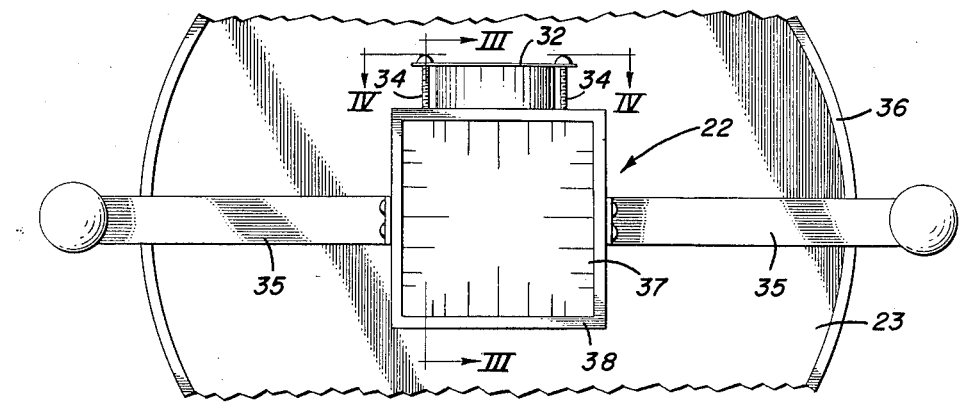
FIG. 2 is a fragmentary, cross sectional view taken along the plane II—II of FIG. 1 and showing the reticle assembly.
Figure 3:
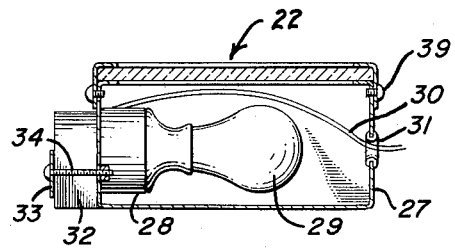
FIG. 3 is a cross sectional, elevational view taken along the plane III—III of FIG. 2.
Figure 4:
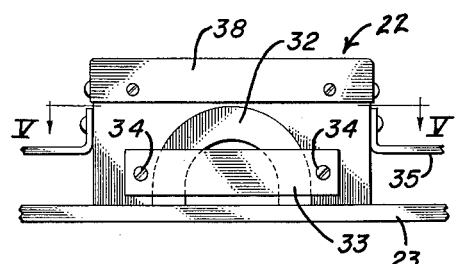
FIG. 4 is a partial, elevational view of the reticle assembly looking at the assembly in the direction indicated by the arrows IV—IV of FIG. 2.
Figure 5:
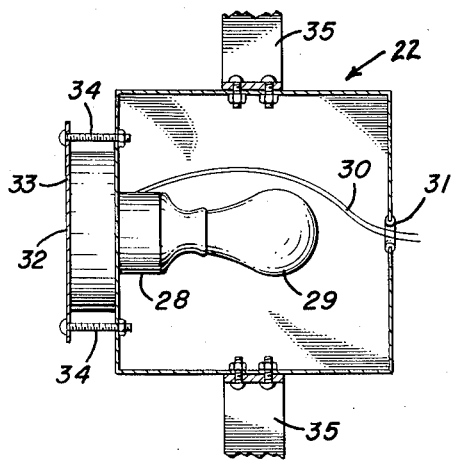
FIG. 5 is a cross sectional, plan view of the reticle assembly taken along the plane V—V of FIG. 4.

Briefly, the method of this invention is for determining the degree of flatness of a glass plate. The steps in the method broadly include arranging the plate to be examined in approximate parallelism and contiguity with a proof plate. Light is then reflected from the surfaces of the plates to form a visual interference pattern indicative of the contour of the plate. A reticle is provided having markings representing certain radii of curvature. The visual interference pattern or an image thereof is superimposed on the reticle or its image. The spacing of the interference pattern fringes are compared with the position of the markings to determine the degree flatness of the plate.

Apparatus of this invention, briefly, includes a housing supporting a proof plate. The proof plate has means for supporting a glass plate approximately contiguous and parallel to the proof plate. A source of light is positioned in the housing to reflect light rays from the surfaces of the proof and glass plates producing a visual interference pattern having fringes indicative of the contour of the glass plate. Means are provided for visually observing the interference pattern. A reticle having markings representing certain radii of curvature is located in a position to be simultaneously observed in superimposed relation with the pattern through the visual observing means. Thus this apparatus permits comparison of the spacing of the fringes with the position of the markings of the reticle to determine the flatness of the glass plates, and whether it meets specifications.

Referring to the drawings, reference numeral 1 denotes an elongated vertical housing circular in cross section and having an open top end. Inclined to the axis of the housing 1 is a reticle housing 2. An eye piece 3 is located diametrically opposite to the housing 2 and approximately concentric therewith. A mounting assembly 4 is located in the open top end of the housing 1. At the lower end is a light source assembly 6. A mirror assembly 7 is mounted between the mounting assembly 4 and light source assembly and also between the reticle housing 2 and eye piece 3. As will be explained in more detail hereinafter, the flatness of a glass plate properly mounted in the open top end of the housing can be determined by observing and comparing the images of an interference pattern and a reticle produced on the mirror.

The reticle housing assembly 2 includes the reticle housing 20 mounted on the end of the cowling 21. The housing 20 and cowling 21, both of circular cross section, have aligned openings 26 and 27 concentric with the opening in the side of housing 1 in which the cowling is mounted. The housing 20 is open at the end opposite the cowling, which end is closed by the plate 23 constructed of a magnetic permeable material for the purpose of hereinafter described. The plate 23 is hinged to the housing 20 by the hinge 24 and is latched at its upper side by the catch 25.

The reticle assembly 22 is located on the plate 23 so that it is in alignment and in focus with the eye piece 3.

FIGS. 2–5 show in more detail the construction of the reticle housing 22. This housing includes a square box 27 having mounted therein the lamp socket 28 supporting the lamp 29. The wires 30 lead from socket 28 through the opening 31 of the box to a source of power (not shown).

A U-shaped magnet 32 is secured to one side of the housing 22 by the plates 33 and tie bolts 34. The ends of the magnet contact the plate 23 constructed of magnetic permeable material so that the entire assembly is held in position by the magnet. Two arms 35 are secured to the sides of the box 27 and extend outwardly beyond the walls of the housing 20 through the slot 36. The magnet is sufficiently strong to hold the assembly 22 in any position on plate 23. However, it permits the assembly 22 to be slid on the plate 23 for adjusting the position of the reticle.

The reticle element 37 is mounted in the top of the box immediately above the light 29. It is secured to the box by the ring element 38, removably attached by screws 39. Thus the reticle element can be replaced by reticles calibrated for the desired radius of curvature as will be explained hereinafter.

The reticle 37 is a square glass piece approximately three inches square and ¼ inch thick. One side of the reticle is coated with an opaque material such as black lacquer which is suitable for scribing the lines B, $C_1$, $C_2$, $C_3$ along each ledge. The spacing of these lines or marks depends upon the radius of curvature for which the reticle is calibrated. The opposite side of the reticle is frosted to reduce the glare of light shining through the scribed lines.

The scaping of the scribed lines of the reticle is determined by a formula derived from the following formula proved and developed in "Introduction to Theoretical and Experimental Optics," by Joseph Valasek, pages 129–133:

$$R = \frac{r_g^2 - r_f^2}{n\lambda}$$

wherein:
$r_g$=radius of one interference fringe in inches; $r_f$=radius of the next interference fringe in inches; $R$=radius of curvature of the glass producing the fringe in inches; $\lambda$=wave length of light=$2.32\times10^{-5}$ inches; $n$=the number of rings evident from the ring of radius $r_g$ up to and including the ring of radius $r_h$ along any radial.

The calibration of the reticle 27 is based upon the above formula and the realization that the distance between fringes intercepted by a line tangent to any circular fringe is related to the difference between the squares of the radii of the two fringes.

As a result of this relationship, the radius of curvature can be determined by the spacing between the points of intersection of a line drawn tangent to one of the fringe circles. FIG. 14 illustrates the mathematical means of deriving a radius of curvature formula based on the spacing between the points of intersection of a tangent line.

Each of the circles $f$, $g$ and $h$ represent a fringe line. Drawing a tangent to the fringe line $f$ at the point A, the points of intersection B and C are noted. Drawing the radial lines OA and OB forms a right angle triangle OAB. From this triangle the following relationship is evident: $r_g^2 = r_f^2 + l^2$. Therefore, $l^2 = r_g^2 - r_f^2$. Substituting in the above formula $$\left(R = \frac{r_g^2 - r_f^2}{n\lambda}\right)$$

$l$ becomes equal to $\sqrt{Rh\lambda}$.

Using this formula, reticles for each radius of curvature can be calibrated. For example, if it is desired to make a reticle for checking 500 feet radius of curvature the following calculations are undertaken:

Given: R=500×12=6000 inches $\lambda$=2.32×$10^{-5}$ inches $n=1$

Then
$l_1$=6000×2.32×$10^{-5}$=.372 inch

When
$n=2$, $l_2$=6000×2.32×$10^{-5}$×2=.527 inch

When
$n=3$, $l_3$=600×2.32×$10^{-5}$×3=.645 inch

It should be understood that the above formula and calculations are based upon circular fringes generally formed between a perfect spherical surface and an optical flat. Interference patterns are usually somewhat elongated and thus not perfectly circular. As a result in order to check the worst condition, it is necessary that the fringes of the greatest curvature be read. This will be explained in more detail under "Operation."

The reticle markings on the lines are projected by light 29 onto the mirror 70 forming a part of the mirror assembly 7. The mirror 70 is a half reflection mirror. It will transmit light or shadows originating beneath it and reflects all lights or shadows originating above it. The mirror 70 is mounted in a frame 71 which has the two notches 72 and 73 on each side. The notch 73 received a hook 74 secured to the housing 1. Therefore, the hook supports one side of the frame. The other notch 72 receives the screws 75 mounted on the support 76 projecting from the housing 1. The screws 75 are adjustable thus providing a means for adjusting the inclination of the frame and the mirror for properly aligning the images of the reticle and interference patterns.

The light source assembly 6 at the bottom of the housing comprises an ozone lamp which provides a monochromatic light source. The assembly also includes the transformer and potentiometer for controlling and adjusting the intensity of light sources. Above the lamp 61 is a wall 62 having an opening 63 through which the light from the lamp 61 projects. Mounted in the opening 63 is the monochromatic light diffusor 64 provided to diffuse any light from the lamp particularly for masking the filament. The monochromatic light originating from the lamp 61 shines upwardly through the mirror 70 to the top end of the housing 1 where the lens 51, proof plate or optical flat 52 and a glass plate 53 are located.

The mounting assembly for the lens, proof plate and glass plate includes a first circular lens support ring 54 located at a slight distance from the top end of the housing 1 and secured to the housing by the screws 55. The ring 54 supports the lens which is a collimating lens for projecting the entire interference pattern produced by the glass plate 53 and proof plate 52 onto the mirror 70.

Above the ring 54 is a support ring 56 secured to the housing 1 by the screws 57. This ring provides the bearing support for the set screws 58 which are threaded into and support the proof plate support ring 59.

The proof plate 52 rests on the ring 59. It has three set screws 60 extending from the flat polished upper surface for supporting the glass plate 53. This proof plate forms the subject matter of my copending application entitled Proof Plate for Fringe Comparators, Serial No. 673,489, filed July 22, 1957, now Patent No. 2,997,913.

Figure 7:
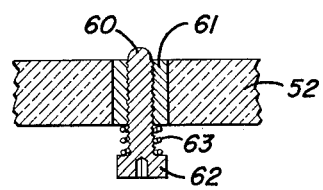
FIG. 7 is a partial, cross sectional, elevational view of a preferred construction for one of the support elements of the novel proof plate.
Figure 8:
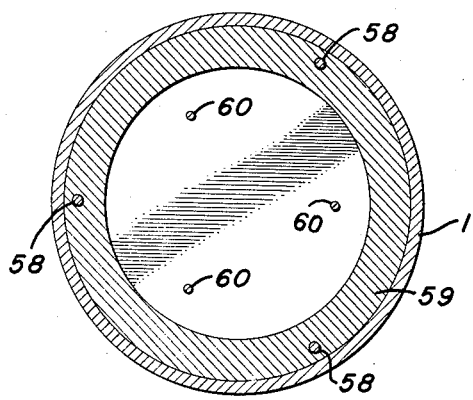
FIG. 8 is a sectional view taken along the plane VIII—VIII of FIG. 1 illustrating the structure of the proof plate.
Figure 11:
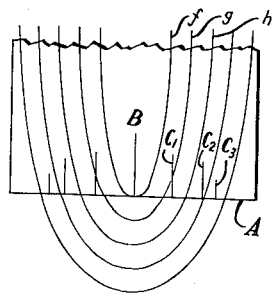
FIGS. 10, 11, 12 and 13 show various images of interference patterns superimposed on a reticle image for determining the radius of curvatures of glass plates.
Figure 10:
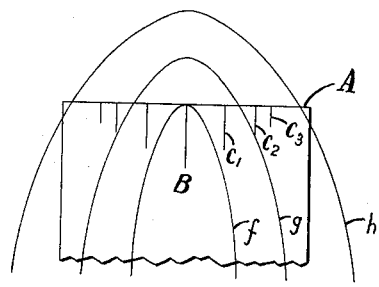
Figure 12:
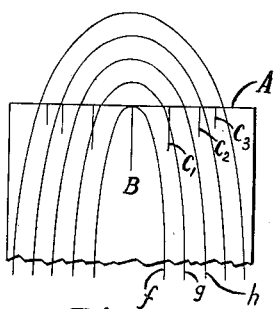
Figure 9:
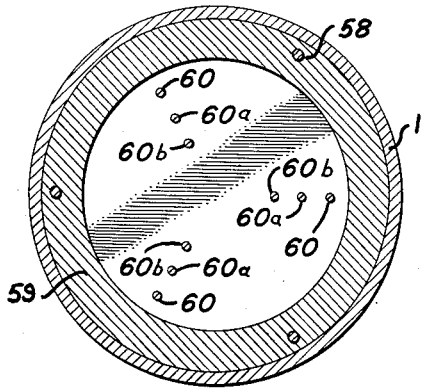
FIG. 9 is a modified arrangement of support elements of the proof plate, such elements being shown in the same cross sectional view of FIG. 8.

The proof plate is shown in more detail in FIGS. 7 and 8. A modification is shown in FIG. 9. This proof plate has a plurality of holes 61 extending entirely through it. The holes are filled with a metallic material tapped for receiving the set screws 60. The set screws have a head 62 provided for the purpose of mounting a spring 63 between the head and the plate. This spring prevents misadjustment of said screws by vibrations or otherwise.

The set screws 60 provide an air wedge of .005 inch to .010 inch. Hence the glass to be examined never directly contacts the optical flat. This has tremendous advantages over more conventional apparatus of this type, such advantages being set forth in more detail in my copending application which also points out it is important that the said screws have one-point contact ends arranged in equally spaced relationship about the center of the proof plate.

FIG. 9 discloses a modification adapted for testing various sizes of glass plates. In this case three sets of set screws are equally spaced about the center of the proof plate. The advantages of this arrangement will be disclosed in more detail in my copending application.

Operation

Having described the various structural details of the apparatus, its operation and consequently the method of this invention will now be described.

The basic principle of this invention is the concept of producing first an image of an interference pattern and secondly an image of a calibrated reticle and superimposing these images for determining the radius of curvature of the plate glass.

The image of the interference pattern is produced by projecting the monochromatic light through the mirror 70, the proof plate 52 and glass plate 53. The light rays projected from the lamp 61 are denoted by the letter L. The light reflected from the plate surfaces is denoted by the letter S. In FIG. 1 it is eivdent the light rays L project upwardly through the mirror and reflected rays S are projected on the mirror. The lens 51 produces patterns as illustrated in FIGS. 10–13. The shape of the interference pattern and the number of spacings of fringes is determined by the surface contour of the glass plate 53. FIGS. 10–13 show various patterns.

The rings $f$, $g$, $h$, etc. represent the various fringes or rings of interference patterns. These patterns are produced on the mirror 70 and are visible by looking through the eyepiece 3.

The image of the reticle 37 is also projected on the mirror 70 by the light 29. These projection lines or reticle emission are represented by the broken lines P. It is evident from the lines S and P and the points of superimposition SP that the image of the interference pattern is superimposed on the reticle 37.

This superimposition of the two images is made possible by adjustment of the reticle or glass plate. When located in the positions shown the reticle and glass plate are in approximate position for superimposition of the two images. Adjustment of the reticle or glass plate, however, is always necessary in order to align one side of the reticle tangent to the fringe of greatest curvature. The reticle adjustment feature has been found to be the easiest and most acceptable because handling of the glass plate is undesirable. The specific adjustment means shown including the holding magnet 32 and handles 35 extending through slots in the housing 20 provides an especially acceptable and easy adjustment means.

The operation of this apparatus is simple and makes it possible to measure the radius of curvature accurately each time. First the particular reticle calibrated for a certain radius of curvature is selected and then inserted into the reticle box by removing the screws 39, replacing a properly calibrated reticle 37 and reinstalling frames 38 and screws 39. The reflecting mirror is then inserted and fixed into position. The screw 75 is adjusted until the light from the open top end of the housing 1 and the light through cowling 21 form two concentric circles on the mirror. This assures approximate superimposing of the reticle and pattern images.

The plate 23 is closed and lamps 29 and 61 are illuminated. The potentiometer is adjusted for the proper intensity of the reticle lamp.

Having installed lens 51, a sample piece of ¼" polished plate glass having a radius of curvature of at least 375 feet is placed over the hole in the proof plate support ring 59. The three set screws 58 are then adjusted for a maximum image brightness.

The support screws 60 in the flat are adjusted to the approximate position above the surface of the flat. Then the proof plate is laid on the glass plate with the support elements pointing downwardly and contacting the top surface of the sample glass plate. It is desired to have a .005" to .010" air wedge between the glass plate and the proof plate. Therefore, the cap screws 60 are adjusted to provide this air wedge. This spacing can be determined by a certain degree turn of the said screws 60 depending on the pitch of the threads.

The glass plate and inverted proof plate produce an interference pattern visible through the eye piece 3. While viewing this pattern, the set screws 60 are adjusted until a bull's-eye is obtained near the edge of the proof plate.

The proof plate and the glass plate are then removed. The proof plate is then placed in the support 59 with the elements 60 pointing upwardly. The sample glass plate is laid on top of the screw elements 60 to check for a bull's-eye. If a bull's-eye is not visible an adjustment is made by removing the proof plate and the sample glass plate and repeating the above steps.

Figure 13:
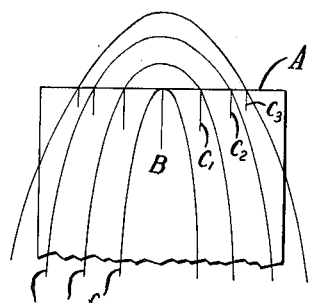

Assuming a bull's-eye is visible and having chosen a reticle calibrated to a radius of curvature which an acceptable glass plate to be tested must have, the plate to be tested is then placed on the set screws of the proof plate. The fringe of greatest curvature is then observed through the eyepiece 3. The position of the reticle box is adjusted until one of the sides of the reticle is tangent to the fringe of greatest curvature. FIGS. 10, 11, 12 and 13 show this relationship. If the fringe lines $f$, $g$ and $h$ cross the side A at $c_1$, $c_2$ and $c_3$, respectively, the radius of curvature is identical to that for which the reticle is calibrated. FIG. 13 shows a pattern.

If conditions are such that the fringe $g$ crosses A between B and $c_1$, and fringe $h$ crosses between B and $c_2$, etc., then the glass plate has a radius of curvature less than 500 feet. However, if the condition of FIG. 10 appears where the fringe line $g$ crosses the side or tangent line A between $c_1$ and $c_2$, etc., then the sample has a curvature greater than 500 feet.

As stated previously, reticles are calibrated for various radii of curvature. Therefore, if it is desired to test a glass plate for curvature of less or greater than 750 feet, the reticle calibrated for a radius of curvature of 750 feet is substituted for the 500 foot reticle. The entire procedure is then repeated.

The sides of the reticles are of given length. For example, two inches is preferred. As a result, this apparatus can be used by adjusting the reticle in such a position that the number of fringe lines can be counted within the two inch distance. Given this number of fringe lines, it is possible with certain formulas to determine the exact radius of curvature of the glass plate being tested.

An added feature of this instrument is that it is possible to tell whether a sample is convex or concave. The method of accomplishing this is to set the bull's-eye at the edge of the flat. Then slight pressure is applied on the sample. If the fringe is moved toward the bull's-eye then it is concave because the applying pressure makes the glass plate more concave.

Having described the structure of our apparatus, its operation and method of this invention, it should be obvious that this invention has distinct advantages. This apparatus and methods substantially eliminate all guess work. It provides a quick and easy manner of determining the flatness of the glass plate. The results achieved with this apparatus and method are accurately produced time after time by different operators. These and other advantages should be obvious from the above description.

Having described our invention it should be understood that although we have shown a preferred form, alterations and modifications are possible within the spirit of this invention. Therefore, this invention should only be limited as expressly provided by the language of the appended claims.

We claim:

1. An optical apparatus for determining the degree flatness of a glass plate comprising: a housing; a proof plate supported by said housing; means for supporting a glass plate approximately contiguous and parallel to said proof plate; a source of light positioned in said housing to reflect light rays from the surfaces of said proof plate and glass plate producing a visual interference pattern having fringes indicative of the contour of said glass plate; a half reflecting mirror in the path of said reflected interference pattern; said mirror being inclined at an angle to the plane of said proof and glass plates; means providing visual observation of said interference pattern reflected from said mirror; a reticle having markings representing certain radii of curvature; a magnetic permeable plate spaced behind said mirror on the opposite side of said visual observation means; said reticle having a magnet attached thereto and engaging said plate for holding said reticle in position; handle means for sliding and adjusting said reticle on said plate to change said position; illumination means behind said reticle for rendering said reticle markings visible through said mirror whereby said markings can be observed simultaneously in superimposed relationship with said pattern for comparing the spacing of the fringes of said pattern with said markings to determine the flatness of said glass plates.

2. An optical apparatus for determining the degree flatness of a glass plate comprising: a housing; a proof plate supported by said housing; means for supporting a glass plate approximately contiguous and parallel to said proof plate; a source of light positioned in said housing to reflect light rays from the surfaces of said proof plate and glass plate producing a visual interference pattern having fringes indicative of the contour of said glass plate; a half reflecting mirror in the path of said reflected interference pattern; said mirror being inclined at an angle to the plane of said proof and glass plates; means providing visual observation of said interference pattern reflected from said mirror; a reticle; a magnetic permeable plate spaced behind said mirror on the opposite side of said visual observation means; said reticle having a magnet attached thereto and engaging said plate for holding said reticle in position; handle means for sliding and adjusting said reticle on said plate to change said position; illumination means behind said reticle for rendering said reticle markings visible through said mirror whereby said markings can be observed simultaneously in superimposed relationship with said pattern for comparing the spacing of the fringes of said pattern with said markings to determine the flatness of said glass plates.

References Cited in the file of this patent

UNITED STATES PATENTS

| | | |
|---|---|---|
| 1,974,522 | Twyman et al. | Sept. 25, 1934 |
| 2,343,621 | Williams | Mar. 7, 1944 |
| 2,420,503 | Stechbart | May 13, 1947 |
| 2,555,387 | Zobel | June 5, 1951 |
| 2,641,160 | Mihalakis | June 9, 1953 |
| 2,648,250 | Zobel | Aug. 11, 1953 |
| 2,725,781 | Banker | Dec. 6, 1955 |
| 2,743,645 | Larsson et al. | May 1, 1956 |

FOREIGN PATENTS

| | | |
|---|---|---|
| 602,459 | Great Britain | May 27, 1948 |